United States Patent
Grau et al.

(10) Patent No.: US 11,824,211 B2
(45) Date of Patent: Nov. 21, 2023

(54) METHOD AND DEVICE FOR THE PRODUCTION OF METAL COMPOSITE FOILS FOR BATTERY CELLS

(71) Applicant: VOLKSWAGEN AKTIENGESELLSCHAFT, Wolfsburg (DE)

(72) Inventors: Frederik Grau, Braunschweig (DE); Kartik Jamadar, Wolfsburg (DE); Christian Theuerkauf, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/237,486

(22) Filed: Apr. 22, 2021

(65) Prior Publication Data

US 2021/0336304 A1 Oct. 28, 2021

(30) Foreign Application Priority Data

Apr. 24, 2020 (DE) .............. 10 2020 111 274.2

(51) Int. Cl.
*H01M 50/105* (2021.01)
*H01M 50/124* (2021.01)

(52) U.S. Cl.
CPC ....... *H01M 50/105* (2021.01); *H01M 50/124* (2021.01); *H01M 2220/20* (2013.01)

(58) Field of Classification Search
USPC ............................... 29/623.1–623.5
See application file for complete search history.

(56) References Cited

U.S. PATENT DOCUMENTS

| 10,516,141 B2 | 12/2019 | Minamitani |
| 2011/0244315 A1* | 10/2011 | Yoon ............ H01M 50/60 156/146 |
| 2015/0249258 A1 | 9/2015 | Wolf et al. |

(Continued)

FOREIGN PATENT DOCUMENTS

| CN | 102208673 A | 10/2011 |
| CN | 105914037 A | 8/2016 |
| CN | 110494229 A | 11/2019 |

(Continued)

OTHER PUBLICATIONS

Office Action for Chinese Patent Application No. 202110447011.4, dated Nov. 10, 2022.

(Continued)

*Primary Examiner* — Carmen V Lyles-Irving
(74) *Attorney, Agent, or Firm* — PEARL COHEN ZEDEK LATZER BARATZ LLP

(57) ABSTRACT

A method for producing a battery cell includes at least the following steps: a) reshaping a first pouch foil into a first pouch half by means of a first molding device with a first recess; b) reshaping a second pouch foil into a second pouch foil by means of a second molding device with a second recess; c) inserting a cell stack into the first molding device and the first pouch half located therein; d) bringing together the first molding device and the second molding device with the second pouch half located therein; and e) at least partially connecting the first and second pouch halves to form a battery cell.

8 Claims, 5 Drawing Sheets

(56) References Cited

U.S. PATENT DOCUMENTS

2020/0331187 A1* 10/2020 Suh ................... H01M 50/103
2020/0406528 A1   12/2020 Jung et al.

FOREIGN PATENT DOCUMENTS

| CN | 110870090 A | 3/2020 |
| EP | 3 566 853 A1 | 11/2019 |
| ER | 3 611 006 A1 | 2/2020 |
| JP | 2006134604 A | 5/2006 |
| JP | 2007311362 A | 11/2007 |
| KR | 10 2016 0 096 417 A | 8/2016 |
| KR | 10 2017 0 075 454 A | 7/2017 |
| KR | 2019 0105765 | 9/2019 |
| WO | WO 2014/079725 A1 | 5/2014 |
| WO | WO 2019/121332 A1 | 6/2019 |

OTHER PUBLICATIONS

Search Report for European Patent Application No. 21 168 472.5, dated Sep. 9, 2021.

\* cited by examiner

METHOD AND DEVICE FOR THE PRODUCTION OF METAL COMPOSITE FOILS FOR BATTERY CELLS

CROSS REFERENCE TO RELATED APPLICATION

This application claims priority from German Patent Application No. 10 2020 111 274.2, filed Apr. 24, 2020, which is incorporated by reference in its entirety.

FIELD OF THE INVENTION

The present invention relates to a method for producing a battery cell and a device for producing a battery cell with a first and a second molding device.

BACKGROUND OF THE INVENTION

With increasing electromobility, there is a greater need for batteries which usually consist of a plurality of battery cells. Therefore, the production of these battery cells is increasingly important for the economic exploitation of this technology. For this purpose, it is already known from the prior art to arrange so-called cell stacks within a casing. Such battery cells can also be referred to as electrolyte pouch cells. The cell stack and an electrolyte are completely enclosed by the casing and only the electrical connections of the battery cells, the so-called collector tabs, protrude outward from the casing in order to enable the battery cells to be electrically connected.

In this connection, various steps for the production of electrolyte pouch cells are known. Metal composite foils can be reshaped into so-called pouch halves by deep drawing. Further working steps include, for example, the separation of the pouch halves, storage thereof and the cell assembly with sealing, in which a cell stack is tightly enclosed by the pouch halves.

However, the previously known concepts have different disadvantages. Individual process steps are currently necessary that have to be carried out serially one after the other and at different workstations. This leads to unnecessarily long process times and it is also necessary to ensure a high level of process accuracy for each individual process step. Another disadvantage is the high investment costs that are required due to the large number of individual systems in connection with the production of electrolyte pouch cells. The large number of individual systems also means that the overall system requires a relatively large amount of space and the material handling between the individual systems is complex.

The object of the present invention is therefore to at least partially solve the problems arising from the prior art. In particular, a method and a device are to be specified which enable the production of battery cells with significantly reduced production costs.

SUMMARY OF THE INVENTION

These objects are achieved by a method and a device having the features of the independent claims. Advantageous further developments are the subject matter of the dependent claims. The features listed individually in the claims can be combined with one another in a technologically sensible manner and can be supplemented by explanatory facts from the description and/or details from the figures, in which further variants of embodiments of the invention are shown.

A contribution to this is made by a method for producing a metal composite foil for battery cells which includes at least the following steps for producing a battery cell:
a) reshaping a first pouch foil into a first pouch half by means of a first molding device with a first recess;
b) reshaping a second pouch foil into a second pouch foil by means of a second molding device with a second recess
c) inserting a cell stack into the first molding device and the first pouch half located therein
d) bringing together the first molding device and the second molding device with the second pouch half located therein
e) at least partially connecting the first and second pouch halves to form a battery cell.

In a first step, a piece of pouch foil is reshaped into a first pouch foil half by means of a first molding device. This can be done, for example, by deep drawing, so that the pouch foil is reshaped into a complementarily shaped recess using a punch. In the second step, a further piece of pouch foil is reshaped into a second pouch foil half by means of a second molding device which also has a recess. These two forming processes a) and b) can optionally be carried out one after the other, simultaneously or at different times.

In step c), a cell stack is inserted into the first pouch foil half which is still in the first molding device. The cell stack has the components required for the battery cells to function. These are usually the anodes, cathodes, their associated active material layers, separator layers, collector lugs and collector tabs. In this case, the active material layers are generally applied to the respective anodes or cathodes, which in turn are connected to the associated collector tab by means of collector lugs.

The two pouch foil halves also remain unchanged in the respective first and second molding devices during the subsequent process steps. In step d), the two molding devices with the pouch foil halves located therein are moved relative to one another so that the two pouch foil halves rest against one another and the embossings formed in the respective recesses enclose a common installation space for receiving the cell stack. In step e), the two pouch foil halves are then at least partially connected to form a battery cell, which can also be designated as an electrolyte pouch cell.

Connection is to be understood as the complete or partial connection of the pouch halves along a contact region in which the two pouch foils or pouch halves are in direct contact with one another. This connection can take place, for example, initially only on three sides of a preferably rectangular battery cell in order to be able subsequently to fill it with an electrolyte and/or to vacuum it before it is then completely closed. The connection of the pouch foils or pouch halves can take place directly or indirectly via a sealing strip arranged between them. For example, the pouch foils or pouch halves resting against one another can be directly and tightly connected to one another by means of gluing, embossing, reshaping or welding. Particularly demanding regions of the battery cell form exit points on the collector tabs that protrude from the battery cell as electrical contacts. In order to seal the battery cell securely and reliably at these exit points, sealing strips can also be arranged there between the pouch foils or pouch halves and ensure complete sealing of the battery cell after being connected to the collector tabs.

The particular advantage is that, after being inserted into the first or second molding device, the pouch foils can remain therein and several working steps can be carried out without the pouch foils or pouch halves having to be removed from the molding device, transported separately or handled in some other way as individual parts. In this way, considerable time savings can be achieved during production. In addition, any springback effects that may occur during the otherwise necessary handling processes can also be completely avoided, so that they cannot have a negative impact on quality.

Steps a) to e) can be carried out at least once in the order a) to e) given here. It is possible that these steps are carried out a different intervals and/or at least partially overlapping in time.

If only a reduced installation space is required within the pouch halves, it is possible to omit step b) and to contact the first pouch half from step a) directly with an undeformed pouch foil located in the second molding device. In this case, the installation space for the cell stack enclosed by the pouch foils is reduced by around 50%, since the second pouch foil has no embossing and thus no enclosed installation space.

In particular, it can be provided that the reshaping of the pouch foil into a pouch half is carried out by means of an atmospheric positive pressure or negative pressure or at least one electromagnetic pulse EMP. In particular, the reshaping by means of an electromagnetic pulse can take place in a very short time, so that production can take place at very high cycle rates. For this purpose, electrical coils can be arranged in the device and are suitable for building up a strong electromagnetic field as soon as an electrical current flows through them. With a suitable alignment of the electromagnetic field generated in this way, the pouch foil is then moved away from the coil and into the molding device by the electromagnetic pulse and the electromagnetic forces caused by it, wherein the respective pressures should act in such a way that the pouch foil is moved into the recess of the molding device. Alternatively or in addition to this, the reshaping of the pouch foil can also take place by means of a negative pressure or a positive pressure, wherein the respective pressures should act in such a way that the pouch foil is moved into the recess of the molding device. These methods can be used individually as alternative methods for reshaping by punching or can be combined with one another for reshaping of the pouch foils.

It is particularly advantageous to use a metal composite foil and especially an aluminum composite foil as the pouch foil. Such pouch foils consist of at least one metal layer and at least one plastics layer. Due to this structure, the metal composite foils are particularly resistant and at the same time can be easily reshaped.

Very particularly advantageously, the pouch half can also be fixed in the molding device by means of a negative pressure. If a negative pressure is applied to the recess of the molding device, this negative pressure can, on the one hand, support the reshaping of the pouch foil. Another advantage, however, is that the pouch foil or the pouch half produced during the reshaping can be securely fixed in the recess of the molding device by means of the negative pressure. This is advantageous, for example, when the position of the molding device is changed. The fixing of the pouch foil by means of negative pressure even allows the molding device to be turned upside down by 180° without the pouch half falling out of the molding device.

Another further development can be that the molding device is heated. The pouch foils used can be reshaped with increasing ease with rising temperatures. For this reason, it makes sense to heat the molding device to a temperature below the melting point of the pouch foil in order to be able to better reshape a pouch foil heated in this way. This has the advantage that, on the one hand, the deep drawing capability is improved, since higher degrees of reshaping can be achieved. At the same time, the heating also reduces the springback of the pouch foil after the reshaping process, so that the dimensional accuracy of the pouch halves produced in this way is also improved.

It is also advantageous if at least two processing steps are carried out while the first and second pouch halves are in each case in the first and second molding devices. In a particularly simple embodiment it can be provided, for example, that at least two process steps are carried out in the molding device. Such typical process steps such are, for example, separating the pouch foil supplied from a pouch foil supply, such as a coil, reshaping the pouch foil into pouch halves, bringing the pouch halves together, inserting the positioning stack, connecting the pouch halves or cutting the outer contour of the pouch halves or of the battery cell. However, as many of these process steps as possible are particularly preferably carried out as long as the pouch foils or pouch halves are in the molding device.

In particular, it can be provided that at least one of the pouch halves or the battery cell with the connected pouch halves is cut to a defined length or outer contour in the molding device. For this purpose, cutting devices which separate the supplied pouch foil from the remaining pouch foil supply can be provided in or on the molding device. Furthermore, in the molding device cutting devices can be provided which cut the supplied pouch foil into a first and a second pouch foil in order to then reshape them into pouch halves in the first and the second molding device, respectively. Finally, further cutting devices can be provided which are designed to cut the outer contour of the reshaped pouch halves individually or to exactly cut the outer contour of the finished battery cell as a whole.

Furthermore, the object is achieved by a device for producing a battery cell, which is equipped with a first and a second molding device and at least one fixing device, a reshaping device, a feed device for cell stacks, a positioning device for bringing together the end faces of the molding devices, a connecting device and a first cutting device.

The device can in particular be set up in such a way that it can carry out (all) steps of the method proposed here.

The device has a first and a second molding device, the end faces of which can be brought into mutual contact by means of a positioning device.

Furthermore, the device has a fixing device in order to be able to fix the pouch foils to be reshaped on the respective molding device.

The reshaping device also provided serves to reshape the fixed and generally planar pouch foils into pouch halves with embossings, in which cell stacks can later be arranged. For this purpose, a feed device is provided that can insert prefabricated cell stacks into the embossings of the pouch halves. The feed device can be implemented, for example, by means of a robot arm which is designed to grip a cell stack and insert it into the embossing of a pouch half, which in turn is located in the recess of the molding device. The cell stack is fed in before the two pouch halves are brought into contact with one another by means of the positioning device.

To connect the pouch halves, a connecting device is provided which can connect or seal the pouch halves with the cell stack arranged therein.

Finally, at least one cutting device is also provided which can exactly cut the outer contour of the pouch halves or the finished battery cell. The outer contour can be trimmed at different times in the sequence of the process steps. In this way, the outer contour of the pouch foil can result immediately after the pouch foil has been fed in from the pouch foil supply. Alternatively, the outer contour of the battery cell can also only be cut to shape after the pouch halves have already been sealed. The time at which the outer contour is cut can thus be selected between the very early or the very late process step, as required.

In a preferred further development, an additional feed device can be provided for feeding pouch foil from a pouch foil supply to the first and second molding devices. In this way, the feeding of pouch foil can also be automated to the greatest possible extent, provided that the cutting device is also designed to cut the length of the fed pouch foil.

Advantageously, it can be provided that at least one molding device has a heating device, as a result of which the reshapability and dimensional accuracy of the manufactured pouch halves is improved.

In particular, the first cutting device can be designed at least for cutting a length or a contour of the pouch foil, the pouch half or the battery cell.

It is also advantageous if a further cutting device is provided for cutting an endlessly fed pouch foil.

The explanations relating to the method can also be used in full to specify the device, and vice versa.

The battery cell produced in this way can advantageously be installed in a motor vehicle because these battery cells can be produced at particularly low unit costs and thus have a positive effect on the costs of the entire vehicle.

As a precaution, it should be noted that the numerals used here ("first," "second," . . . ) serve primarily (only) to differentiate between a plurality of similar objects, sizes or processes, and in particular, therefore, do not necessarily prescribe any dependency and/or sequence of these objects, sizes or processes relative to one another. Should a dependency and/or sequence be necessary, this is explicitly stated here or it is evident for the person skilled in the art to study the specifically described configuration.

BRIEF DESCRIPTION OF THE DRAWINGS

The invention and the technical environment are explained in more detail below with reference to the accompanying figures. It should be pointed out that the invention is not intended to be limited by the exemplary embodiments mentioned. In particular, unless explicitly stated otherwise, it is also possible to extract partial aspects of the facts explained in the figures and to combine them with other components and findings from the present description. In particular, it should be pointed out that the figures and in particular the proportions shown are only schematic. In the drawings.

DETAILED DESCRIPTION OF THE INVENTION

Figure 1:
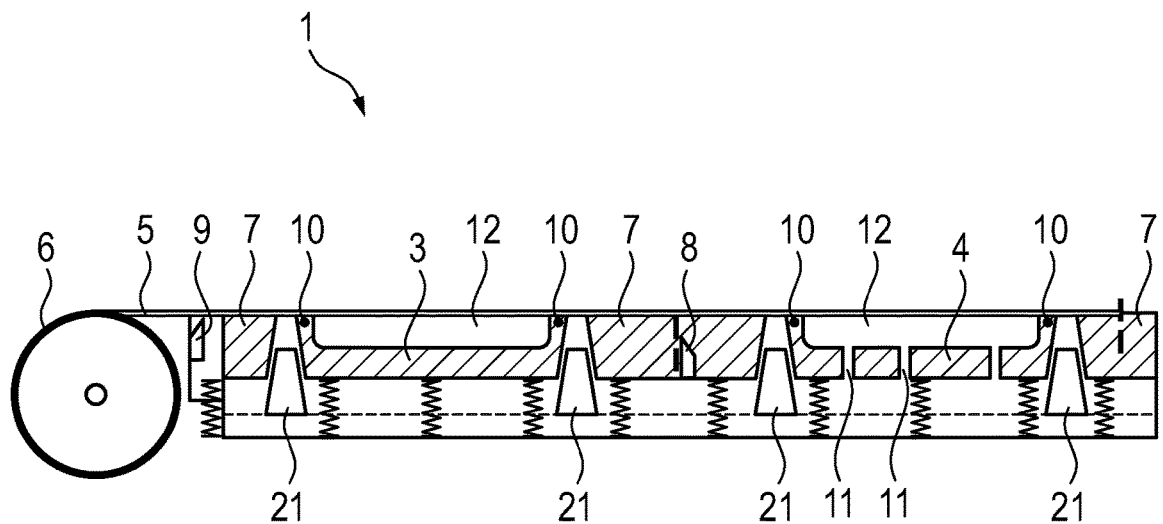
FIG. 1: is a schematic side view of an apparatus for producing battery cells.

In FIG. 1, a device 1 for producing battery cells 2 is shown schematically in a side view. The device 1 has a first molding device 3 and a second molding device 4. From the left side, a pouch foil 5 is fed from a pouch foil supply 6 in the direction of the first and second molding devices 3, 4, so that these are covered by the pouch foil 5. The molding devices 3, 4 thereby form part of a die 7 of the device 1. The die 7 is resiliently mounted together with the first molding device 3 and the second molding device 4 and, when acted upon on its upper side, can be deflected downward with forces acting downward in the image plane. Furthermore, the device 1 is equipped with a first cutting device 8 and a second cutting device 9, the mode of operation of which will be explained later.

The first molding device 3 and the second molding device 4 are each equipped with a heating device 10 which is suitable for heating the molding devices 3, 4 to a temperature above room temperature. As a rule, pouch foils 5 consist of a composite of plastics and metals. By heating the pouch foil 5, the deep drawability of the pouch foil can be improved, so that greater degrees of reshaping can be achieved. This is precisely what is achieved by means of the heating device 10 in that the molding devices 3, 4 and thus also the pouch foil 5 are heated. The heating is preferably carried out to a temperature which is still below the melting temperature of the plastics used in the pouch foil 5.

In a bottom region of the second molding device 4, suction ducts 11 are provided, which can be subjected to a negative pressure by means of a vacuum pump (not shown) in order to draw the pouch foil 5 into a recess 12. The vacuum generated here can fulfill two functions. The first function is to support the reshaping process and to improve the deep drawability of the pouch foil 5. This is achieved by drawing out the trapped air below the pouch foil by the vacuum applied during deep drawing. This prevents a bulge in the pouch foil due to trapped air during reshaping. The second function consists in securely fixing the pouch foil 5 or a pouch half 13, 14 produced by the deep drawing process (shown in FIG. 2) in the recess 12 when the molding device is moved together with this pouch half 13, 14.

Furthermore, the second molding device 4 has a first cutting device 8 and a second cutting device 9. The first cutting device 8 is used to divide the pouch foil 5 supplied from the pouch foil supply 6 into two parts. The second cutting device 9 serves to separate the pouch foil 5 from the pouch foil supply 6.

Figure 2:
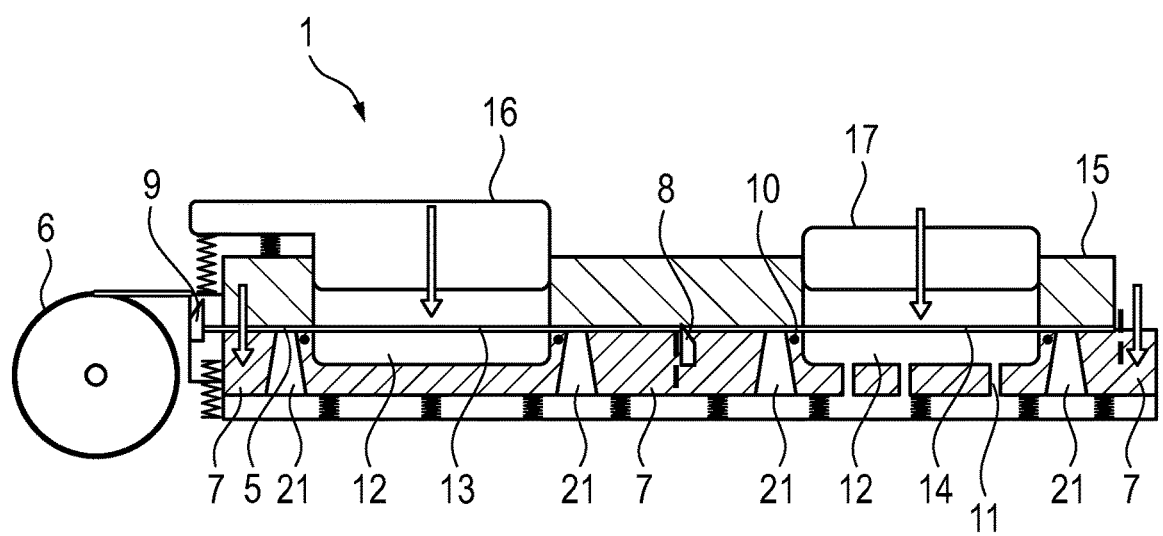
FIG. 2: shows the device according to FIG. 1 in a second state.

In FIG. 2 the device 1 is shown in a second state, in which the pouch foil 5 is pressed against the die 7 by a hold-down device 15. In this state, the die 7 is shown together with the first molding device 3 and the second molding device 4 in a deflected state against a stop with a stationary die insert 21, i.e. the springs are compressed so that the pouch foil 5 is held securely between the hold-down device 15 and the die 7. The die insert 21 is used to create a flat surface for the reshaping process. During the process of lowering the hold-down device 15, the second cutting device 9 has separated the pouch foil 5 from the pouch foil supply 6. At the same time, the first cutting device 8 has separated the pouch foil 5 into a first pouch half 13 and a second pouch half 14. It can also be seen in this illustration that a first punch 16 and a second punch 17 are in a position above the pouch halves 13, 14.

Figure 3:
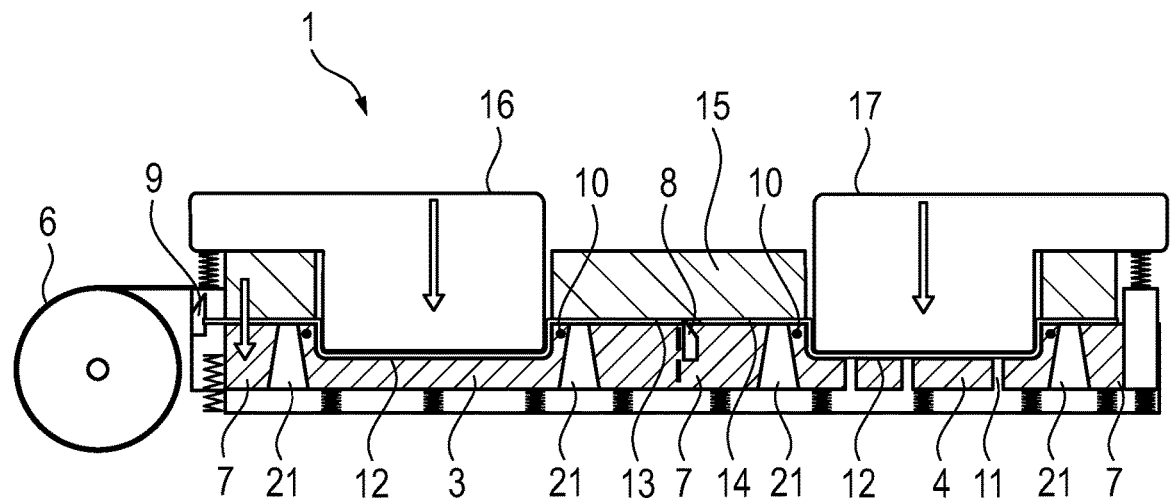
FIG. 3: shows the device according to FIG. 1 in a third state.

FIG. 3 shows a third state in which the punches 16, 17 are moving downward and into the recesses 12. The first pouch half 13 and the second pouch half 14 are each reshaped into the recess 12, which is supported by the heat input by the heating device 10.

Figure 4:
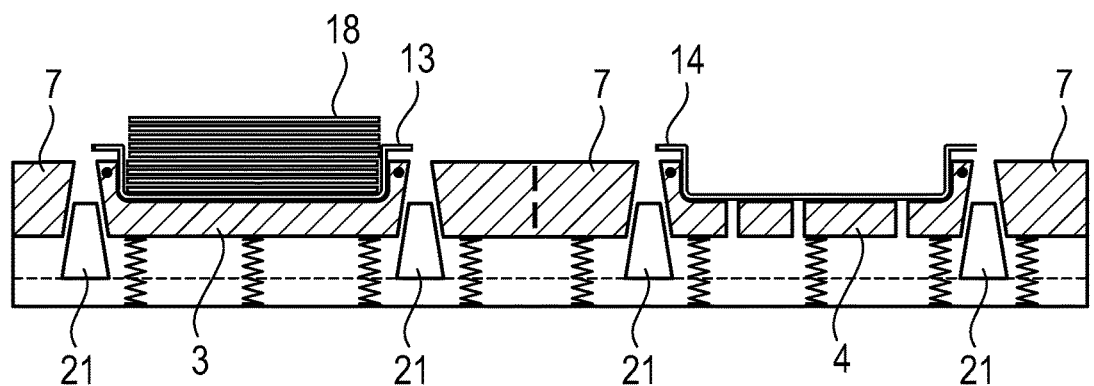
FIG. 4: shows the device according to FIG. 1 in a fourth state.

A fourth state is shown in FIG. 4, in which the punches 16, 17 have moved upward again and have reached their starting position again. In this process step, a cell stack 18 is inserted into the first pouch half 13. The cell stack 18 can be fed in in an automated manner, for example, by a feed device (not shown). For this purpose, for example, a conveyor belt system can feed the prefabricated cell stack 18, which can then be optionally inserted into one of the two pouch halves 13, 14 with the aid of a gripper. The pouch halves 13, 14 can be drawn in during the entire assembly process by means of the vacuum in the die 12 and can be fixed in this way. In a particularly simple embodiment, such as the one shown here, it may also be sufficient to apply a vacuum to only one molding device 14 and to fix the second pouch half 14 located therein if only this second molding device 4 is to be moved. In this case, the reshaping process in the first molding device 3 is to be carried out so slowly that the air enclosed therein can escape. The reshaping can also take place at a higher speed if simple ventilation channels are provided in the first molding device, which are suitable for guiding the air trapped between the pouch foil 5 and the die 12 to the outside of the molding device 3. In the present case, provision is made for changing the position of the second molding device 4 by means of a positioning device (not shown).

Figure 5:
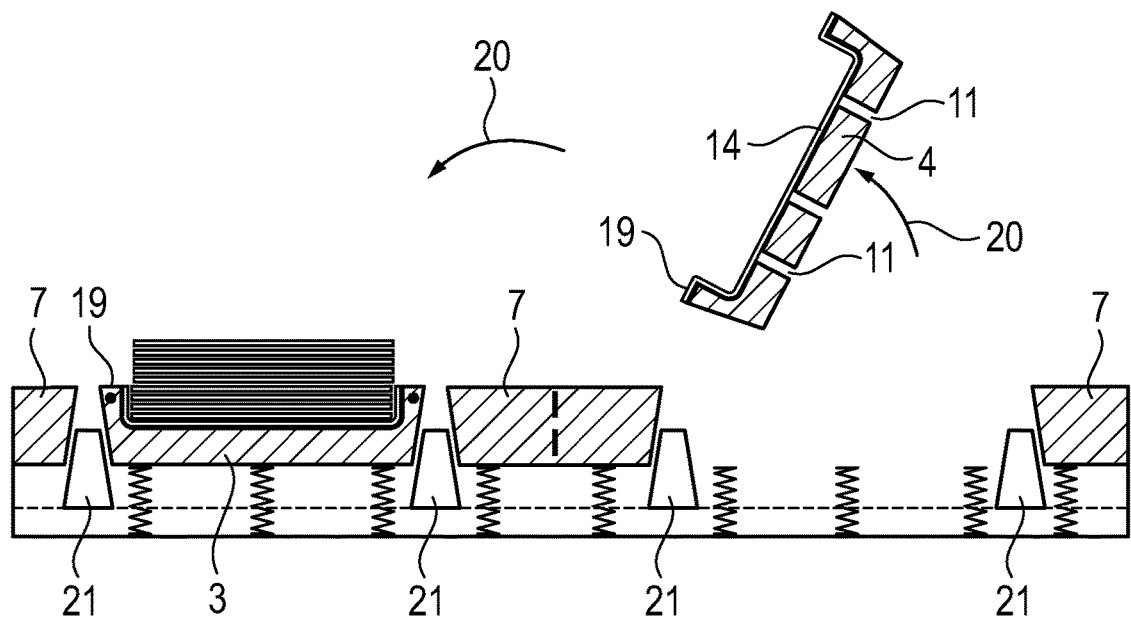
FIG. 5: shows the device according to FIG. 1 in a fifth state.
Figure 6:
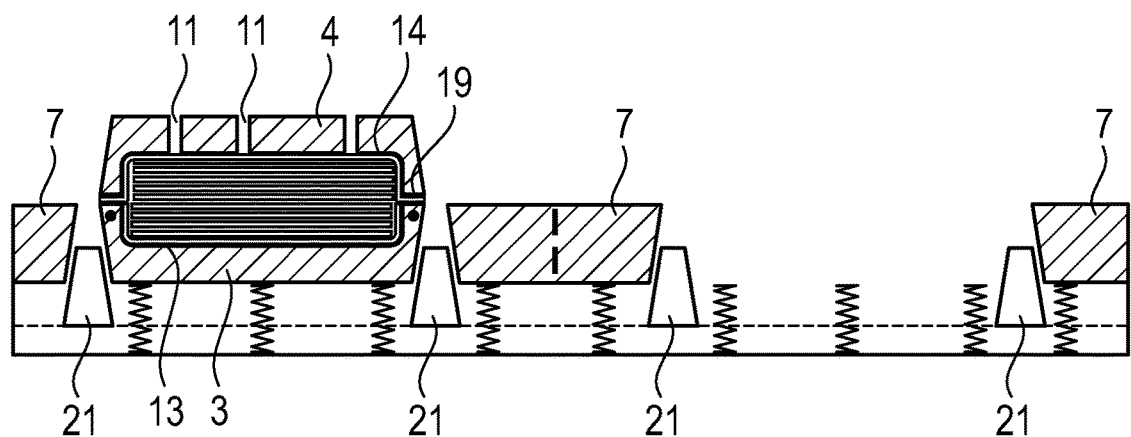
FIG. 6: shows the device according to FIG. 1 in a sixth state.

FIG. 5 shows how the second molding device 4 is pivoted to the left by means of the positioning device with an end face 19 along the arrows 20 in the direction of the end face 19 of the first molding device 3. In addition to the pivoting movement in the direction of the arrows 20, the second molding device 4 also performs a rotary movement about its horizontal longitudinal axis so that, after a complete run through the movement path predetermined by the positioning device, the end face 19 of the first molding device 3 is in direct contact with the end face 19 of the second molding device 4. This state is shown in FIG. 6. During the pivoting, the second pouch half 14 is held securely in the second molding device 4 by means of the vacuum.

Figure 7:
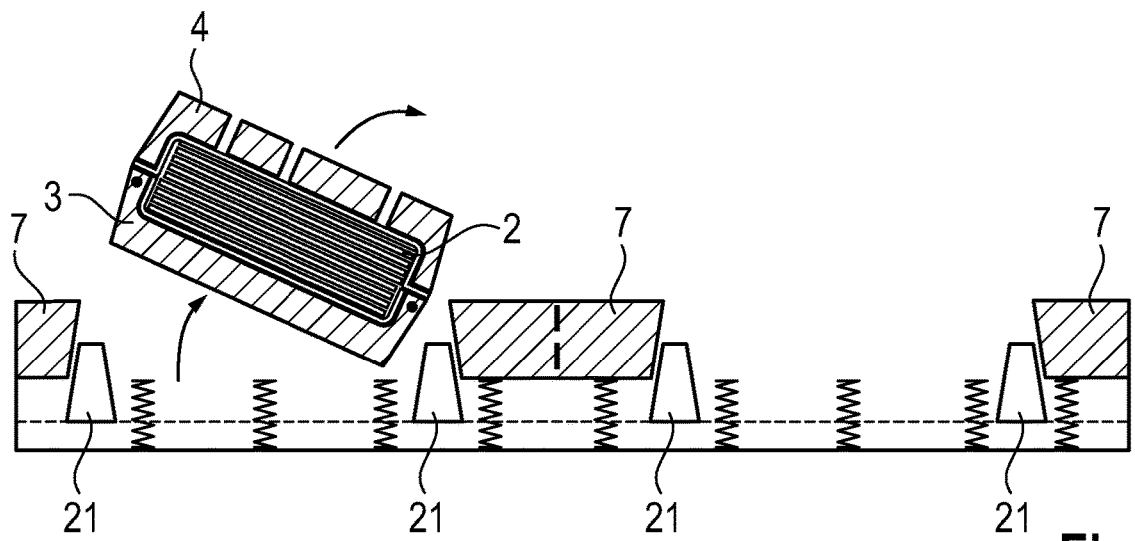
FIG. 7: shows the device according to FIG. 1 in a seventh state.

In the next process step shown in FIG. 7, both molding devices 3, 4, together with the pouch halves 13, 14 and the cell stack 18 are pressed together and pivoted by 90° to the right into an upright position.

Figure 8:
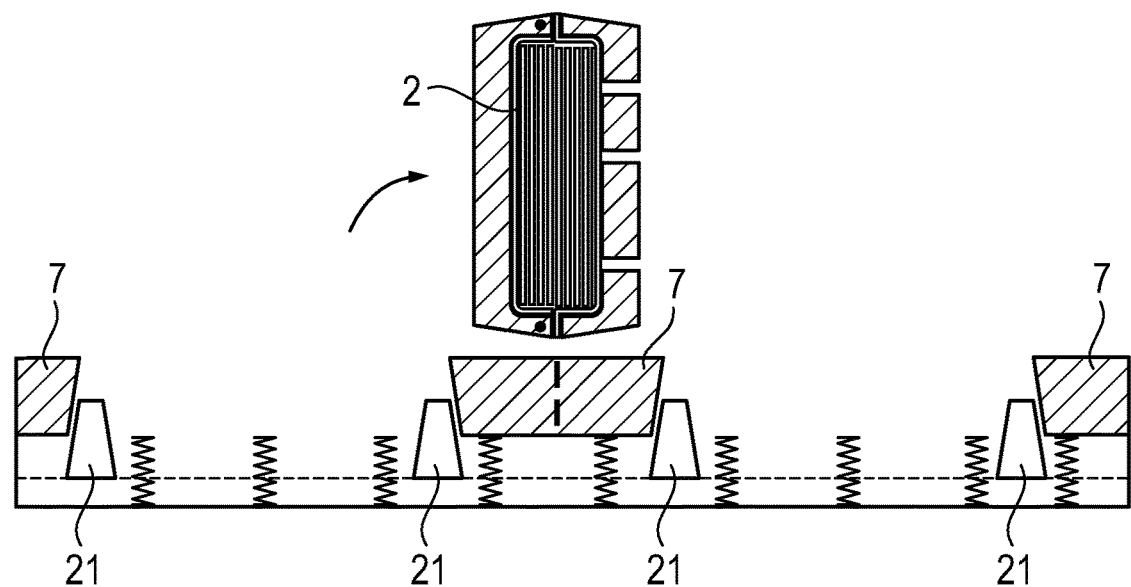
FIG. 8: shows the device according to FIG. 1 in an eighth state.

In this upright position shown in FIG. 8, the pouch halves 13, 14 of the battery cell 2 are connected to one another, i.e. the pouch halves 13, 14 are tightly connected to one another on at least three sides. This process is also referred to as sealing of the battery cell 2. The sealing of the battery cell 2 can take place in this process step using methods and devices that have already been tried and tested.

Figure 9:
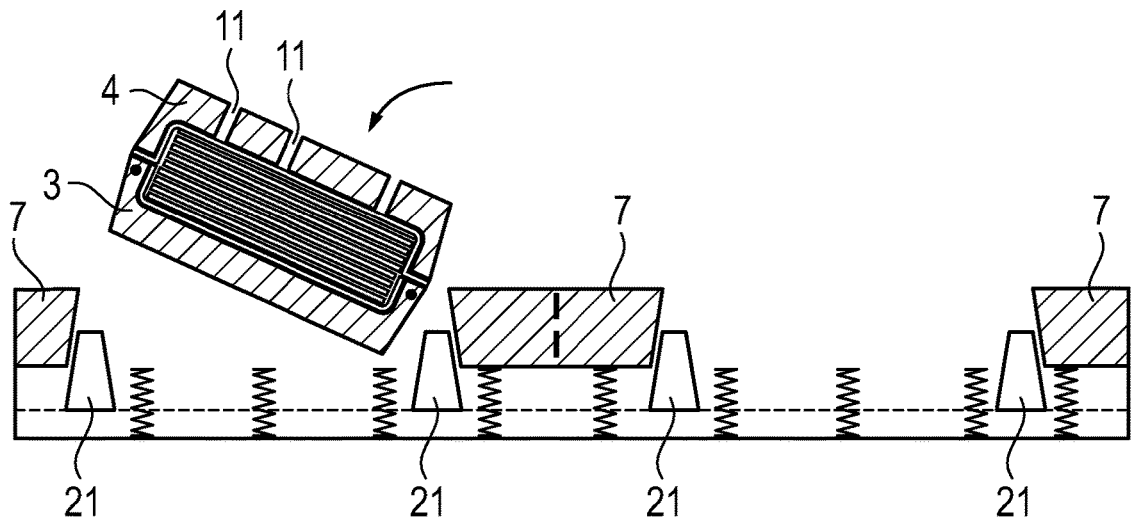
FIG. 9: shows the device according to FIG. 1 in a ninth state.
Figure 10:
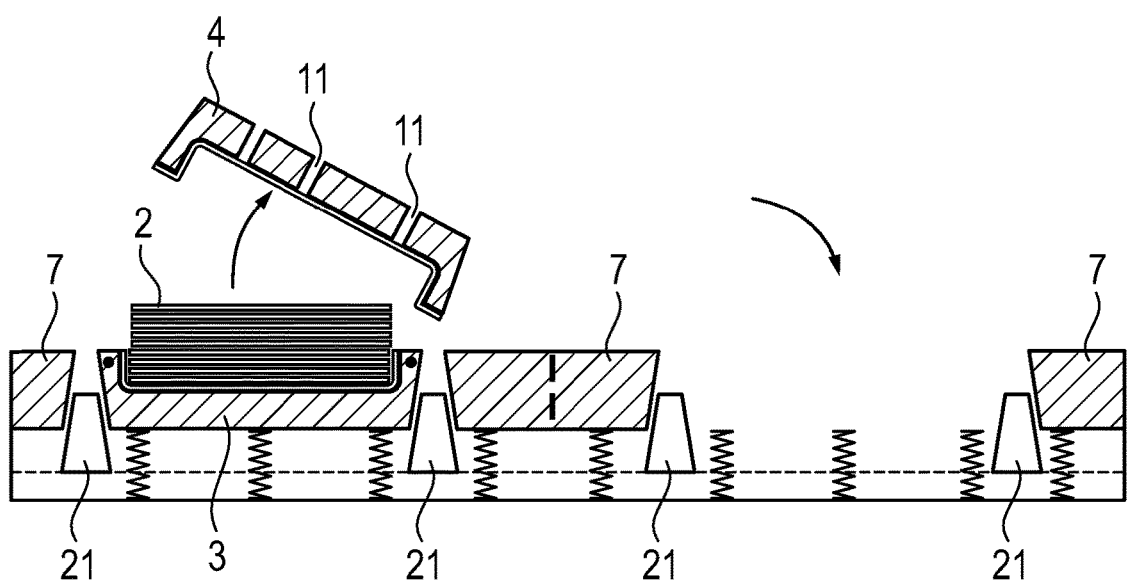
FIG. 10: shows the device according to FIG. 1 in a tenth state.

FIG. 9 shows how the molding devices 3, 4 are moved back together with the battery cells 2 after they have been connected or sealed. The positioning device initially moves all three components back to the left, so that the first molding device 3 returns to its starting position. Then, as shown in FIG. 10, the second molding device 4 is shocked to the right back into its starting position. The finished battery cell 2 is exposed and can be removed. The positioning device is designed so that it can move both the first molding device 3 and the second molding device 4 in the manner shown. This can be done, for example, by mechanical drives and gears or also by means of freely movable robots by which the molding devices 3, 4 can be detected and moved.

The present invention thus has a number of advantages. Several process steps can thus be carried out without the pouch foil 5 or the produced pouch foil halves 13, 14 having to be removed, stored, repositioned or positioned again. The separating cut from the pouch foil supply 6, the process of reshaping the pouch foil, the final cut of the outer contours, the insertion of the cell stack 18 and the process of connecting or sealing can be carried out at just a single workstation. In this case, the battery cells 2 or their components always remain within the molding devices during all process steps, so that the product quality, the cycle times and the accuracy in production are considerably improved. Furthermore, the need for handling the materials used is considerably reduced. The cell stack 18 can also be positioned substantially more precisely and better within the pouch halves 13, 14. In addition, a particularly precise final cut of the finished pouch halves 13, 14 or the finished battery cells 2 can be achieved through the suitable arrangement of cutting devices, for example in the form of blades in the die 7.

LIST OF REFERENCE SIGNS 1 device
2 battery cells
3 first molding device
4 second molding device
5 pouch foil
6 pouch foil supply
7 die
8 first cutting device
9 second cutting device
10 heater
11 suction duct
12 recess
13 first pouch half
14 second pouch half
15 hold-down device
16 first punch
17 second punch
18 cell stack
19 end face
20 arrows
21 die insert

The invention claimed is:
1. A method for producing a battery cell, which includes at least the following steps:
   a) reshaping a first pouch foil into a first pouch half by means of a first molding device with a first recess;
   b) reshaping a second pouch foil into a second pouch half by means of a second molding device with a second recess;
   c) separating the first pouch foil and the second pouch foil from a pouch foil supply while the first and second pouch halves are in the first and second molding devices, respectively;
   d) inserting a cell stack into the first molding device and the first pouch half located therein;
   e) subsequently bringing together the first molding device with the first pouch half located therein and the second molding device with the second pouch half located therein;
   f) at least partially connecting the first and second pouch halves to form a battery cell; and g) cutting an outer contour of the first and second pouch halves or the battery cell, following at least partially connecting the first and second pouch halves to form a battery cell and while the first and second pouch halves are in the first and second molding devices, respectively.

2. The method according to claim 1, wherein the reshaping of the pouch foil into a pouch half is carried out by means of an atmospheric positive pressure or negative pressure, or at least one electromagnetic pulse EMP.

3. The method according to claim 1, wherein the pouch half is fixed in the first or second molding device by means of a negative pressure.

4. The method according to claim 2, wherein the first or second molding device is heated.

5. A device for producing a battery cell by the method according to claim 1, wherein the device comprises:

a first and a second molding device and, in each case, at least one fixing device,
a reshaping device,
a feed device for cell stacks,
a positioning device for bringing together the end faces of the molding devices,
a connecting device, and
a first cutting device.

6. The device according to claim 5, wherein at least one of the first and second molding devices has a heating device.

7. The device according to claim 5, wherein the first cutting device is designed at least for cutting a length or a contour of at least the pouch foil, the pouch half or the battery cell.

8. The device according to claim 5, further comprising a second cutting device for cutting an endlessly fed pouch foil.

* * * * *